(12) United States Patent
Nam et al.

(10) Patent No.: US 11,291,073 B2
(45) Date of Patent: Mar. 29, 2022

(54) WAKE-UP BEAM MANAGEMENT FOR CONNECTED-MODE DISCONTINUOUS RECEPTION (C-DRX) OPERATION

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 16/517,196

(22) Filed: Jul. 19, 2019

(65) Prior Publication Data

US 2020/0029386 A1    Jan. 23, 2020

Related U.S. Application Data

(60) Provisional application No. 62/701,421, filed on Jul. 20, 2018.

(51) Int. Cl.
| | |
|---|---|
| *H04L 12/26* | (2006.01) |
| *H04W 76/28* | (2018.01) |
| *H04L 5/00* | (2006.01) |
| *H04W 72/04* | (2009.01) |
| *H04W 24/08* | (2009.01) |

(52) U.S. Cl.
CPC ........... *H04W 76/28* (2018.02); *H04L 5/0048* (2013.01); *H04W 24/08* (2013.01); *H04W 72/042* (2013.01)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS

| | | | | |
|---|---|---|---|---|
| 2004/0014429 | A1* | 1/2004 | Guo | H04B 7/0632 |
| | | | | 455/73 |
| 2017/0195027 | A1* | 7/2017 | Baek | H04L 5/0048 |
| 2017/0251518 | A1* | 8/2017 | Agiwal | H04W 76/28 |
| 2017/0288763 | A1* | 10/2017 | Yoo | H04W 72/085 |
| 2018/0255607 | A1* | 9/2018 | Nagaraja | H04L 5/0048 |
| 2018/0278310 | A1* | 9/2018 | Lee | H04B 7/0645 |

OTHER PUBLICATIONS

Intel Corporation: "C-DRX enhancement in NR", 3GPP Draft; R2-1708791 CDRX, 3rd Generation Partnership Project (3GPP), Mobile Competence Centre, 650, Route Des Lucioles, F-06921 Sophia-Antipolis Cedex, France, vol. RAN WG2, No. Berlin, Germany; Aug. 21, 2017-Aug. 25, 2017 Aug. 20, 2017, XP051318595, Retrieved from the Internet: URL:http://www.3gpp.org/ftp/Meetings_3GPP_SYNC/RAN2/Docs/ [retrieved on Aug. 20, 2017], 5 pages.

(Continued)

*Primary Examiner* — Siren Wei
(74) *Attorney, Agent, or Firm* — Patterson + Sheridan, L.L.P.

(57) ABSTRACT

Certain aspects of the present disclosure provide techniques for wake-up signal beam management.

25 Claims, 14 Drawing Sheets

(56) References Cited

OTHER PUBLICATIONS

InterDigital Communications: "C-DRX Beam Management Aspects", 3GPP Draft; R2-1701187 (NR SI AI10214) C-DRX Beam Management Aspects, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 12, 2017 (Feb. 12, 2017), pp. 1-3, XP051211879, Retrieved from the Internet: URL: http://www.3gpp.org/ftp/Meetings_3GPP_SYNC/RAN2/Docs/ [retrieved on Feb. 12, 2017].
International Search Report and Written Opinion—PCT/US2019/042713—ISA/EPO—dated Sep. 24, 2019.
Samsung: "Beamformed NR C-DRX Operation," 3GPP Draft; R2-1713793 Beamformed NR C-DRX Operation, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Nov. 29, 2017, Nov. 17, 2017, XP051372448, 4 pages, Retrieved from the Internet: URL: http://www.3gpp.org/ftp/tsg%5Fran/WG2%5FRL2/TSGR2%5F100/Docs/ [retrieved on Nov. 17, 2017] section 2 on p. 1 along with section 2.2.

\* cited by examiner

| Condition | Type A) Waking-up UE + BM | Type B) BM only |
|---|---|---|
| If detected | • UE prepare to wake up for the next ON duration<br>• UE may also perform beam measurement and reporting | • UE performs beam measurement and L1 reporting<br>• Based on the report, gNB may update WUS beam set and indicate UE, e.g., via MAC-CE |
| Subsequent operations | • UE wakes up and starts monitoring PDCCH during the ON duration | • UE goes back to sleep |
| Triggering conditions | • gNB has data to transmit for the next ON duration | • Periodic: once every X DRX cycle<br>• Timer-based: Y DRX cycle from the previous Type A/B WUS transmission |
| Benefits | • Rough BM with WUS helps fast ramping up of UE for the next ON duration<br>➢ Fast L1 feedback from WUS measurement | • Occasional BM helps keep UE in track when the inactive duration get very long |

FIG. 13

WAKE-UP BEAM MANAGEMENT FOR CONNECTED-MODE DISCONTINUOUS RECEPTION (C-DRX) OPERATION

CLAIM OF PRIORITY UNDER 35 U.S.C. § 119

The present application for patent claims benefit of U.S. Provisional Patent Application Ser. No. 62/701,421, filed Jul. 20, 2018, assigned to the assignee hereof and hereby expressly incorporated by reference herein.

FIELD

Aspects of the present disclosure relate to wireless communications, and more particularly, to techniques for beam management for wake-up signals sent before ON periods of connected-mode discontinuous reception (C-DRX).

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes monitoring for at least one type of beam-swept wake-up signal transmitted from a network entity before an ON period of a connected-mode discontinuous reception (C-DRX) cycle, performing beam measurement of the beam-swept wake-up signal, and reporting the beam measurement for use in beam management by the network entity.

Certain aspects provide a method for wireless communications by a network entity. The method generally includes transmitting at least one type of beam-swept wake-up signal to a user equipment (UE) before an ON period of a connected-mode discontinuous reception (C-DRX) cycle, receiving a beam measurement report from the UE, based on measurements of the beam-swept wake-up signal, and adjusting a set of beams used for a subsequent transmission of the beam-swept wake-up signal, based on the beam measurement report.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 13 illustrates example types of WUS for beam management (BM), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
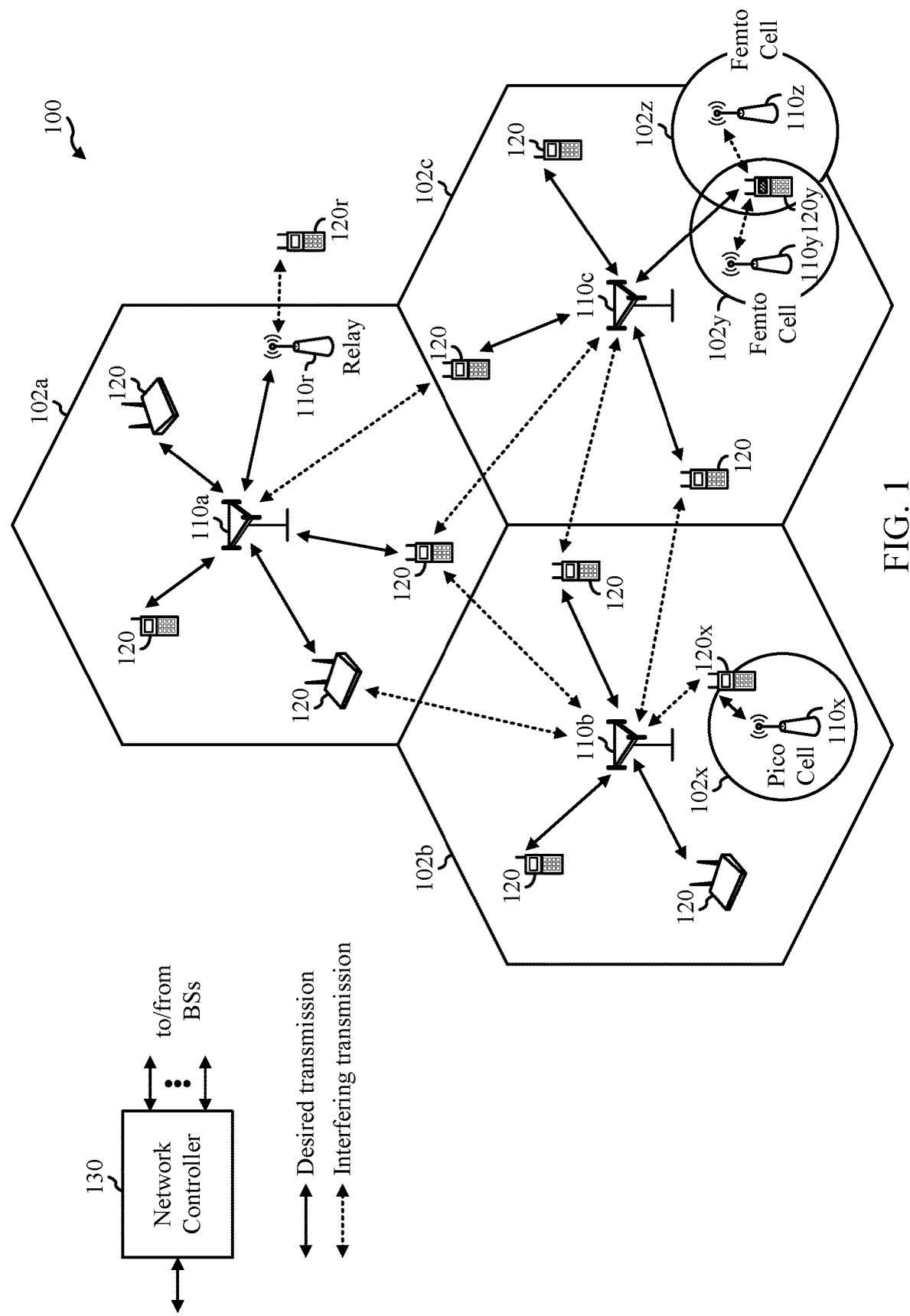
FIG. 1 is a block diagram conceptually illustrating an example telecommunications system, in accordance with certain aspects of the present disclosure.

Aspects of the present disclosure provide apparatus, methods, processing systems, and computer readable mediums for beam management (BM) for C-DRX operations that utilize a wake up signal (WUS).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 and BS 110 may perform operations shown in FIGS. 11 and 12, respectively, for beam management for wake up signals (WUS) transmitted by the BS 110 before an ON period of a C-DRX cycle.

The wireless communication network 100 may be a New Radio (NR) or 5G network. As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., abase station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
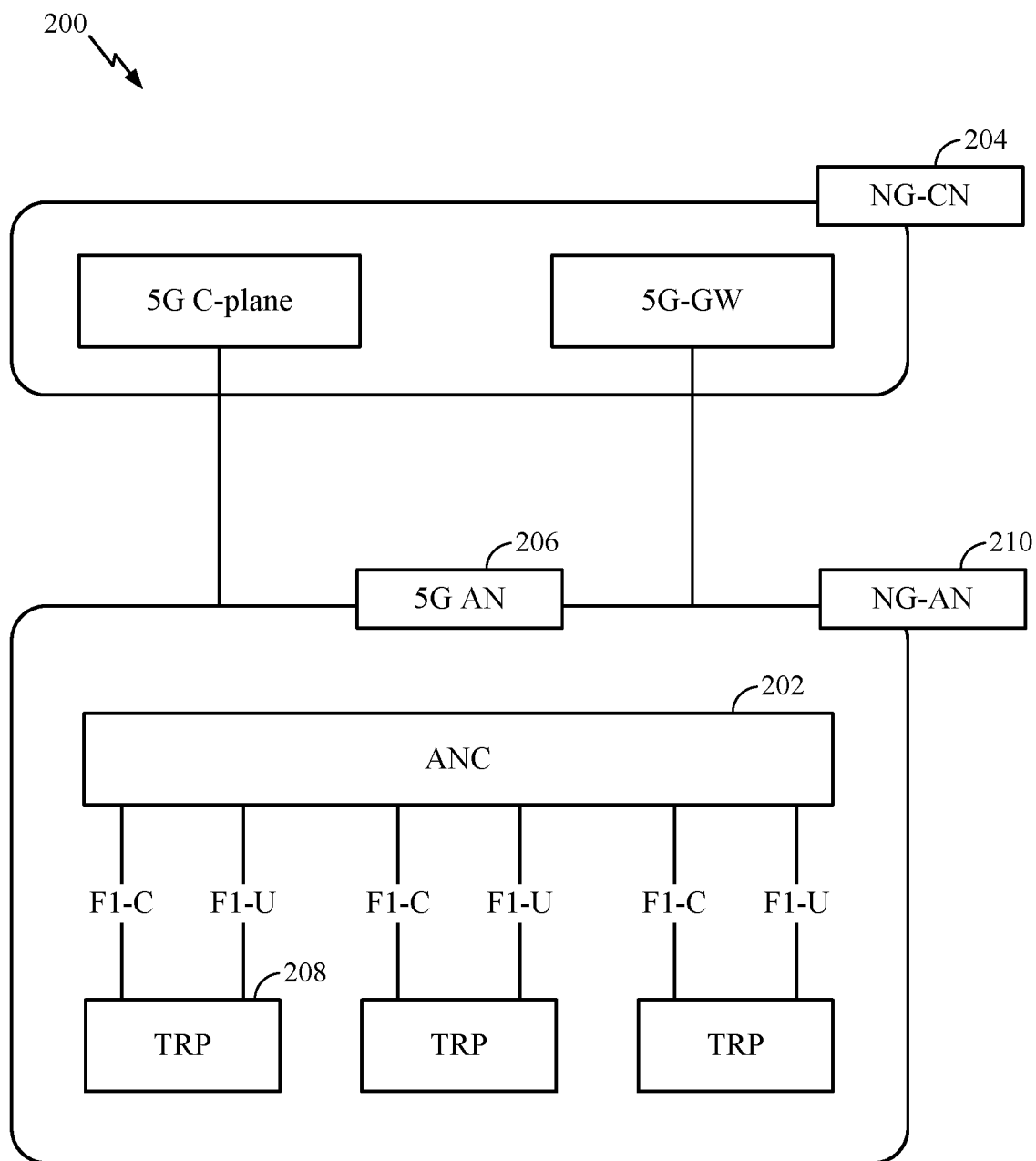
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
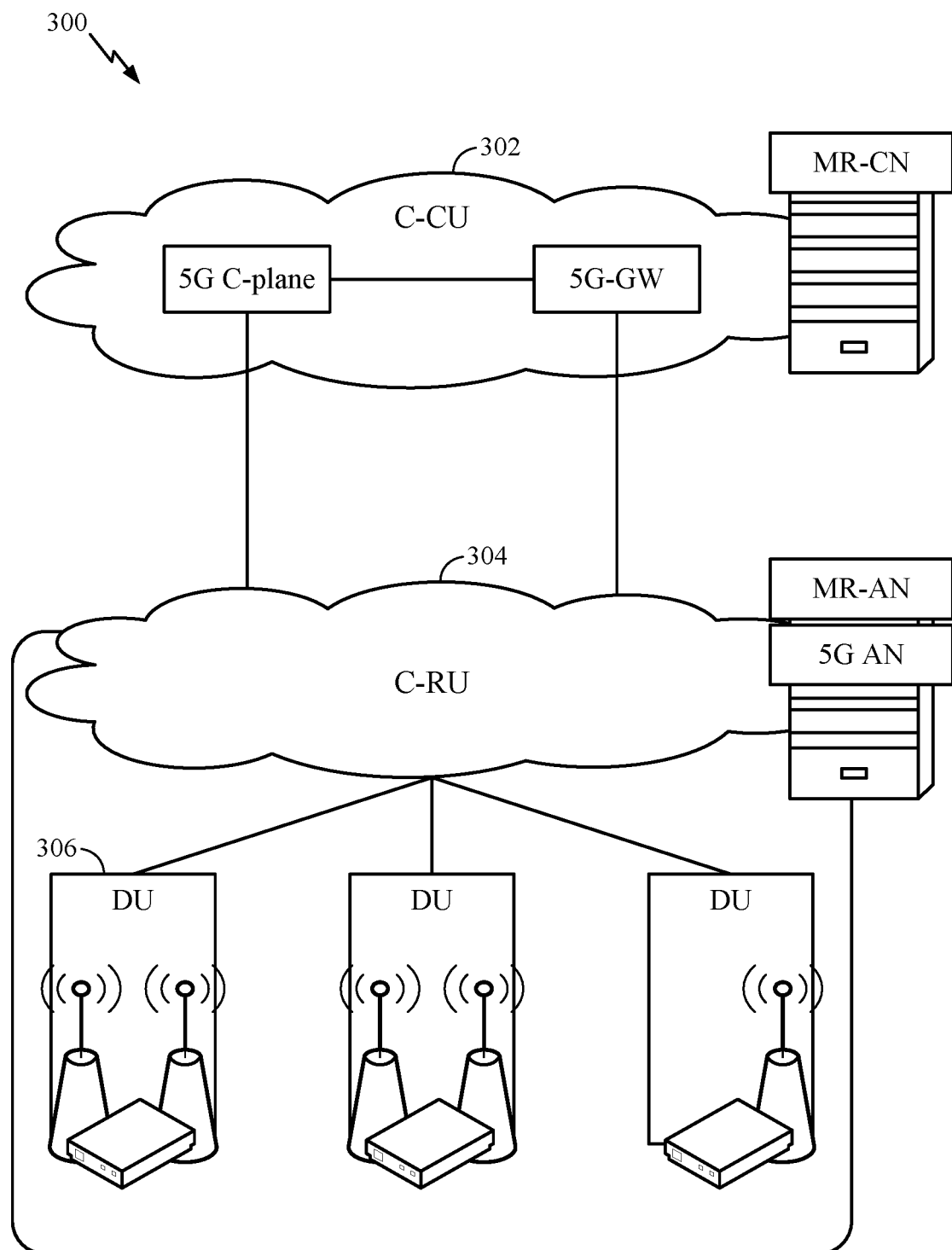
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
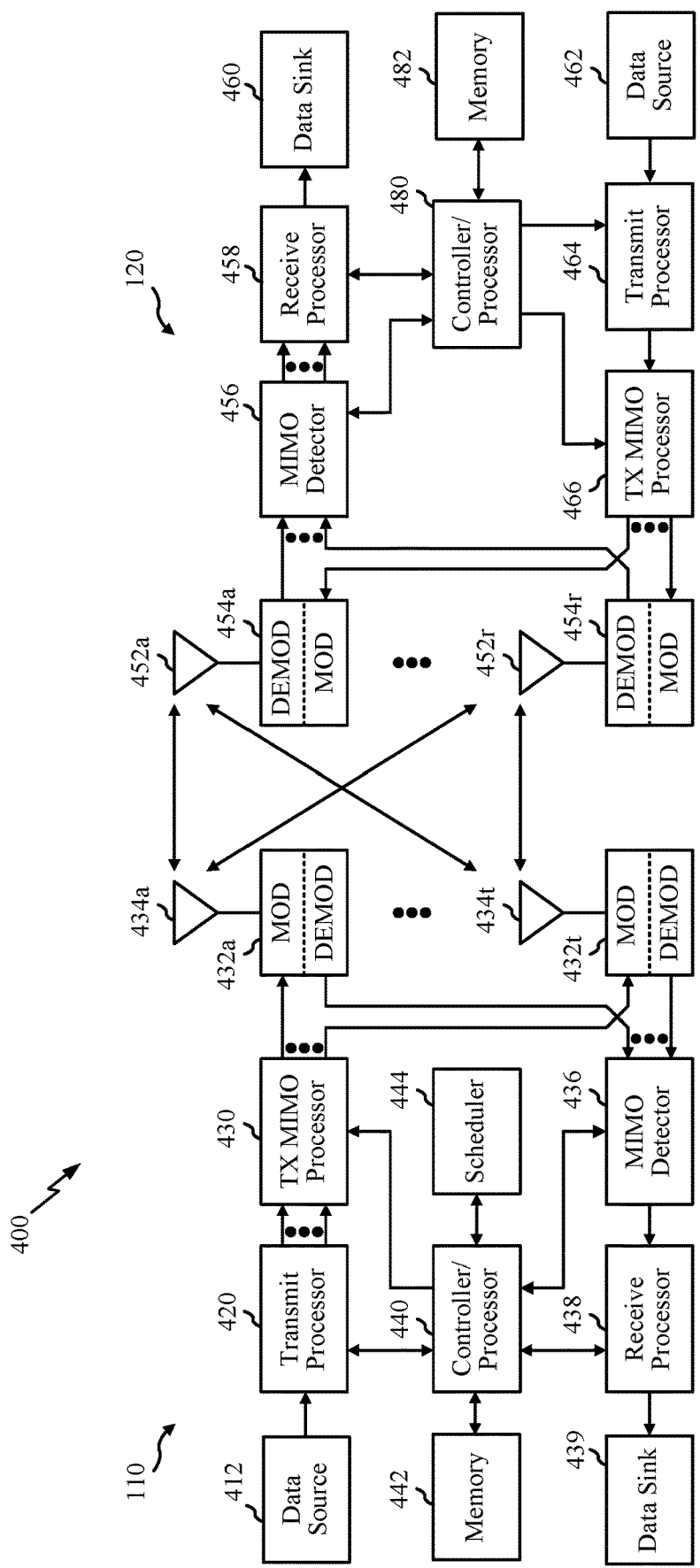
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein (e.g., operations 1100 and 1200 of FIGS. 11 and 12).

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
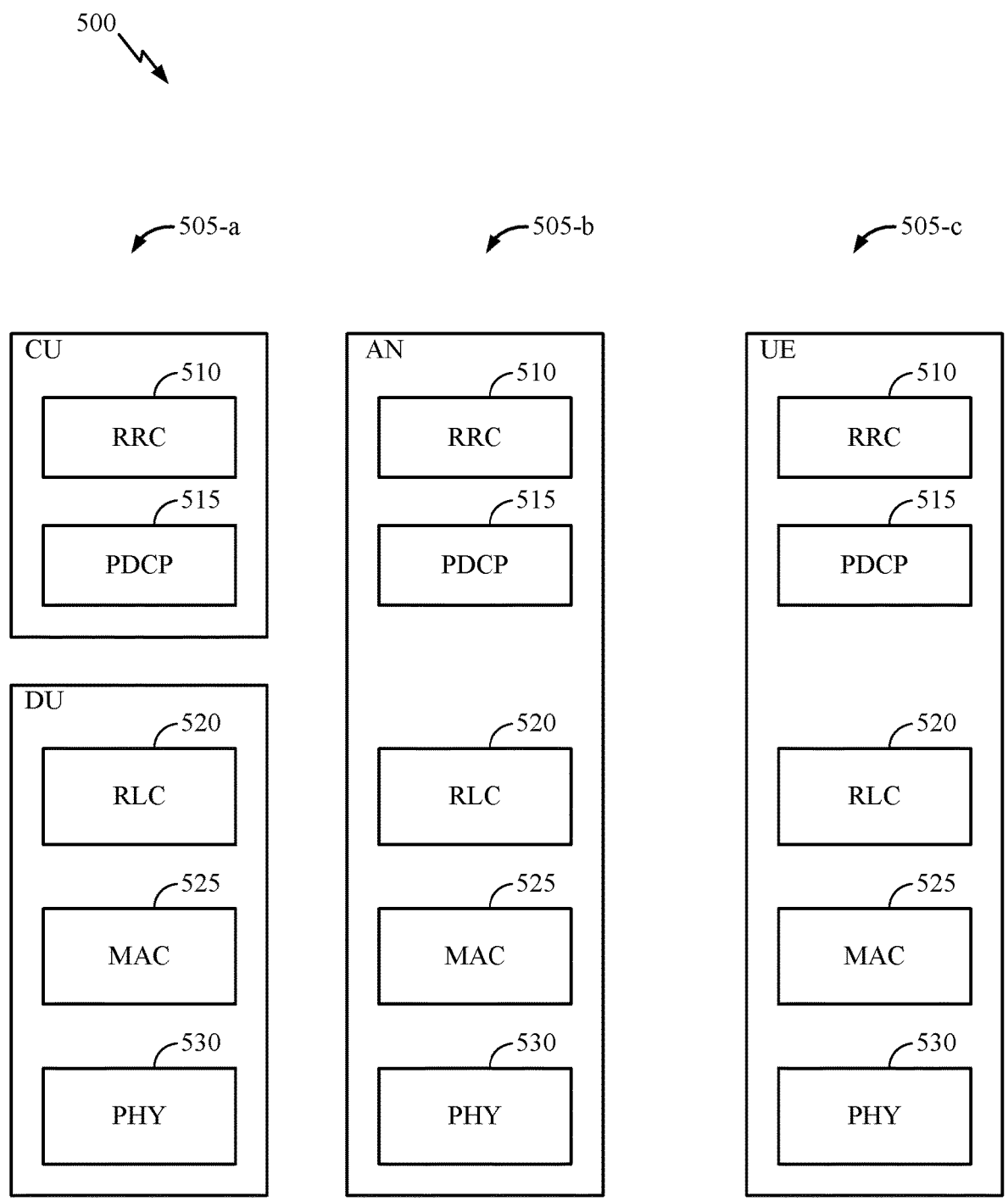
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
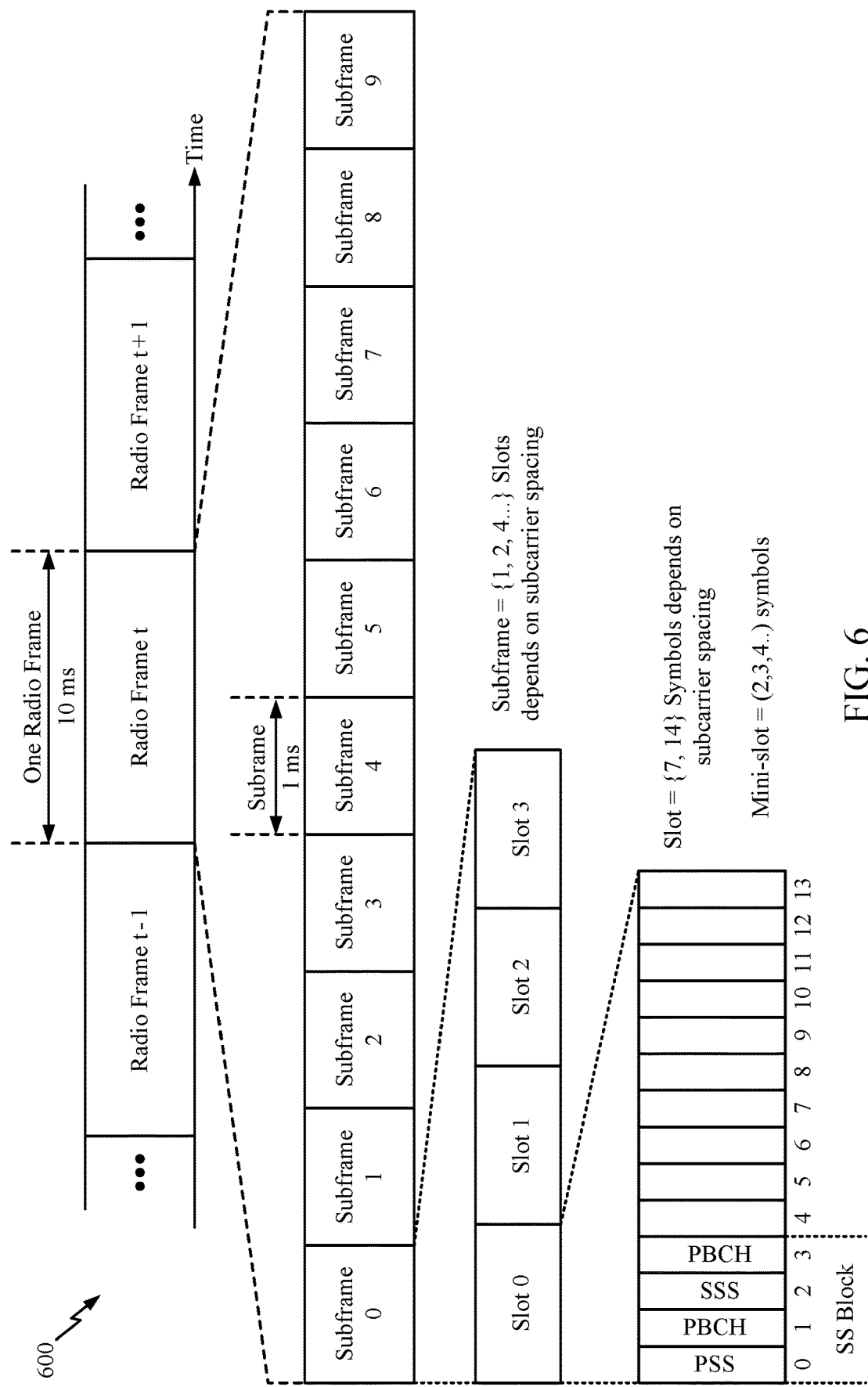
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example C-DRX with Beamforming and Wake-Up Signals

Figure 7:
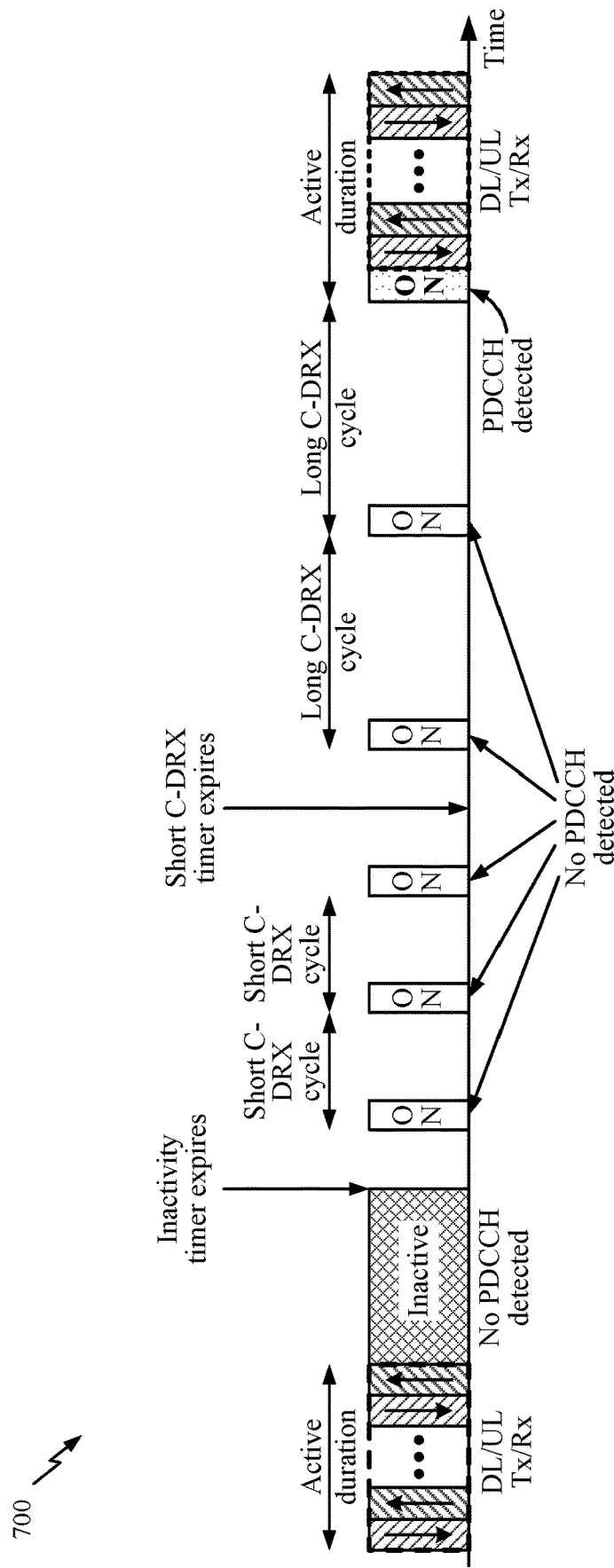
FIG. 7 illustrates connected-mode discontinuous reception (C-DRX) operations, in which aspects of the present disclosure may be practiced.

As illustrated in the example timing diagram 700 of FIG. 7, during periods of traffic inactivity, UE may switch to C-DRX operation for power saving. In C-DRX, when there is no data transmission in either direction (UL/DL) for a UE in an RRC connected mode, the UE goes into the DRX mode. In C-DRX, the UE monitors the PDCCH channel discontinuously, In other words UE alternates between sleep (DRX OFF) cycles and wake (DRX ON) cycles. C-DRX results in power savings because, without the DRX cycles, the UE would needlessly monitor for PDCCH transmissions in every subframe to check if there is downlink data available.

A UE may be configured for C-DRX according to various configuration parameters, such as an inactivity timer, short DRX timer, short DRX cycle, and long DRX cycle.

As illustrated in FIG. 7, based on configured cycles, UE wakes up occasionally for ON durations and monitors for PDCCH transmissions. Except for ON durations, the UE may remain in a low power (sleep) state referred to as an OFF duration, for the rest of C-DRX cycle. During the OFF duration, the UE is not expected to transmit and receive any signal.

As illustrated, the UE may wake-up at a termination of C-DRX mode. For example, if the UE detects a PDCCH scheduling data during an ON duration, UE remains on to transmit and receive data. Otherwise, the UE goes back to sleep at the end of the ON duration.

Figure 8:
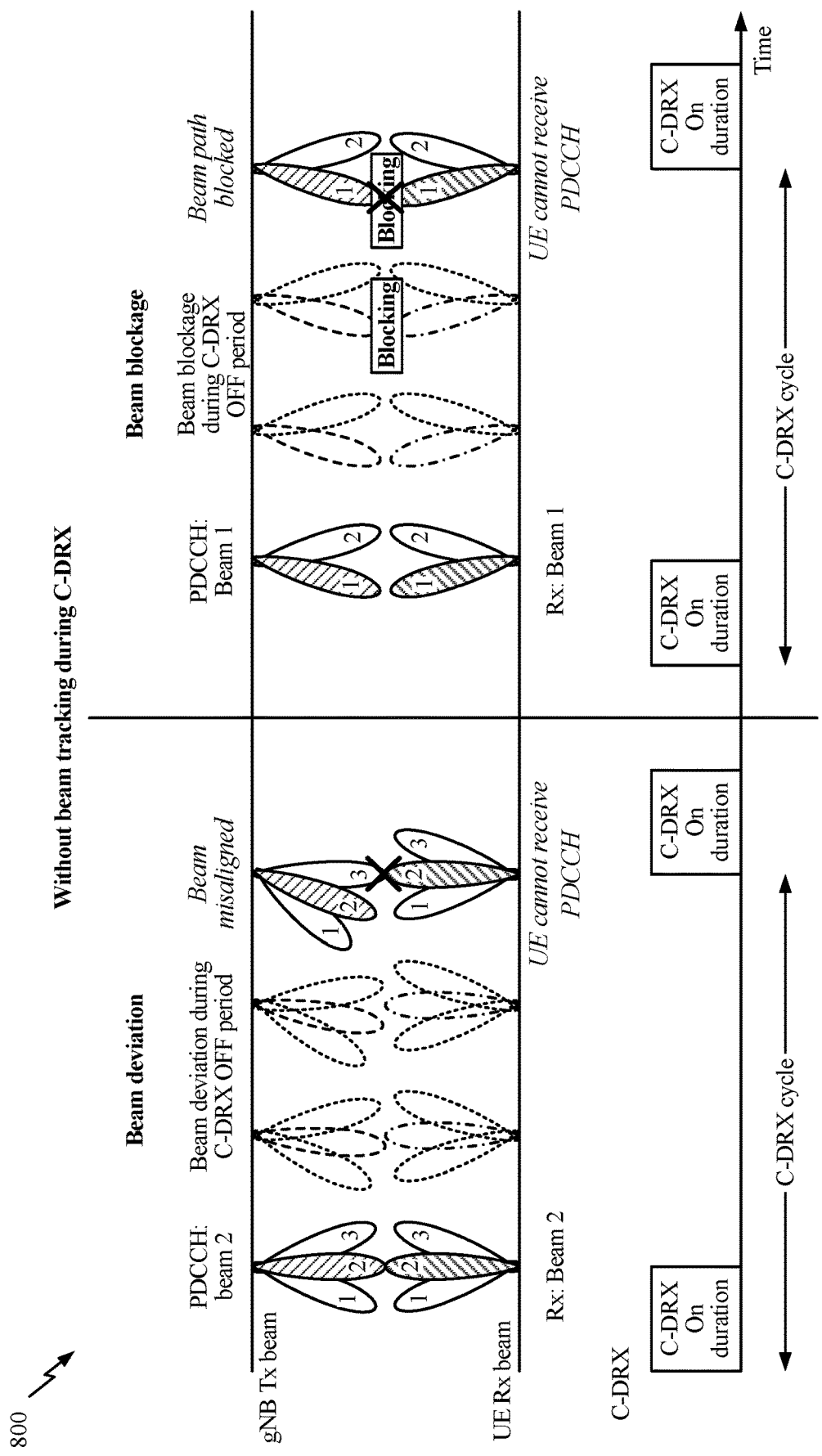
FIG. 8 illustrates C-DRX with beamforming, in which aspects of the present disclosure may be practiced.

As illustrated in the example timing diagram 800 of FIG. 8, in some cases, to enhance possibility or reaching the UE, beamforming may be used with C-DRX. While beamforming may enhance communications, it is not without challenges. For example, without beam tracking, beam pairs may degrade during C-DRX OFF period. The longer the C-DRX cycle, the more vulnerable transmissions are to beam degradation. While shorter C-DRX cycles may be less prone to beam degradation, shorter periods suffer from a power consumption penalty.

As illustrated in FIG. 8, due beam deviation by UE orientation change or mobility (or beam blocking or MPE, etc.), a UE may not be able to receive PDCCH in the beginning of the next C-DRX ON duration and fail to wake-up.

Figure 9:
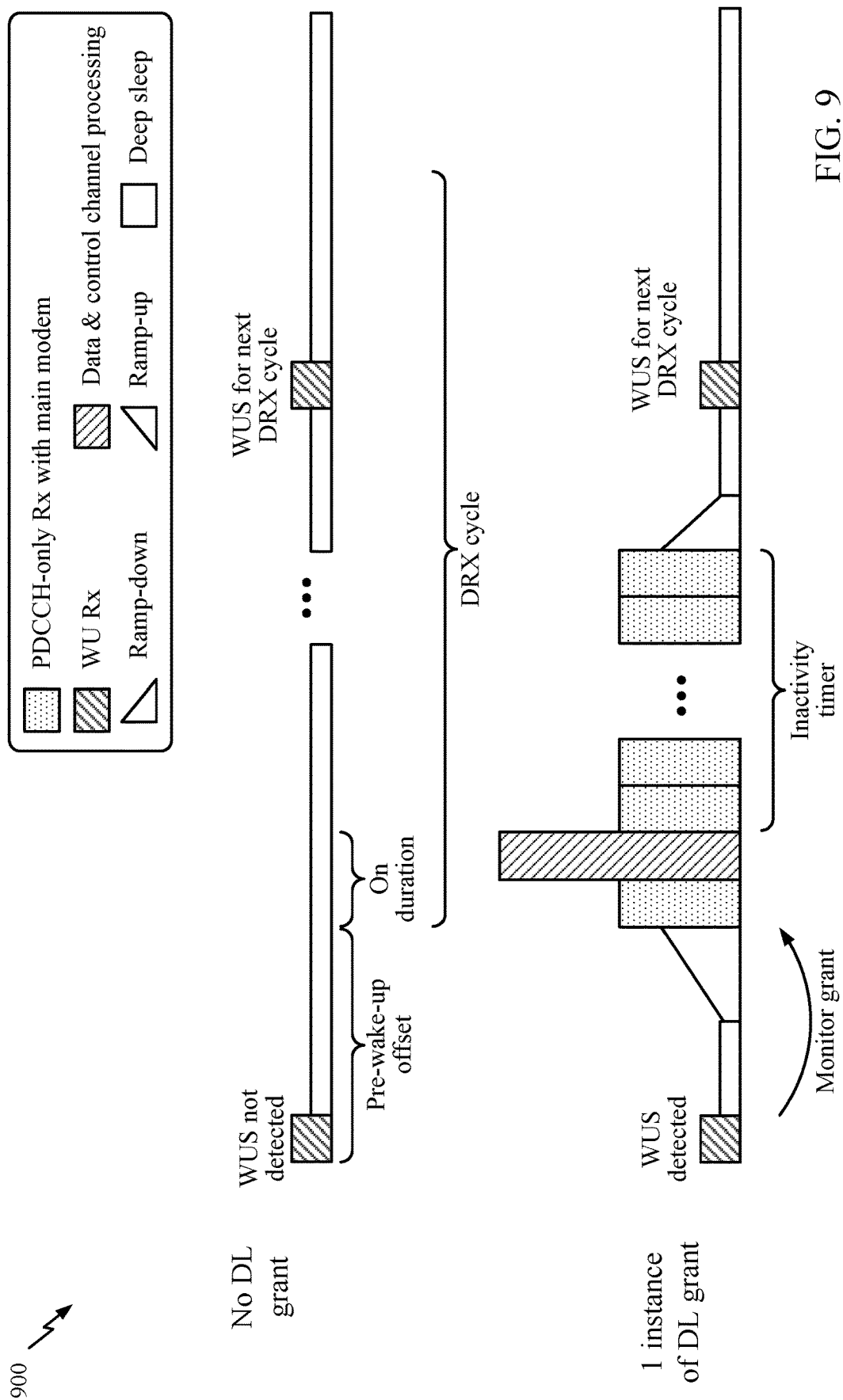
FIG. 9 illustrates example C-DRX with wake-up signals (WUS), in which aspects of the present disclosure may be practiced.

In some cases, sleep (OFF) durations may be extended using wake-up signals (WUS). The general principle of WUS in C-DRX is illustrated the example timing diagram 900 of in FIG. 9.

As illustrated, before C-DRX on duration, only a wake-up subsystem is turned on for WUS decoding (while the main modem is not powered on). The wake-up subsystem is typically a low complexity receiver (e.g., a simple correlator) using lower power than PDCCH decoding. The WUS may be a special waveform, such as special tone, preamble, reference-signal, or the like.

As illustrated, only when WUS is detected, the UE wakes-up the full modem for the next ON duration. Otherwise, UE skips ON duration and goes back to sleep until the next C-DRX cycle.

Figure 10:
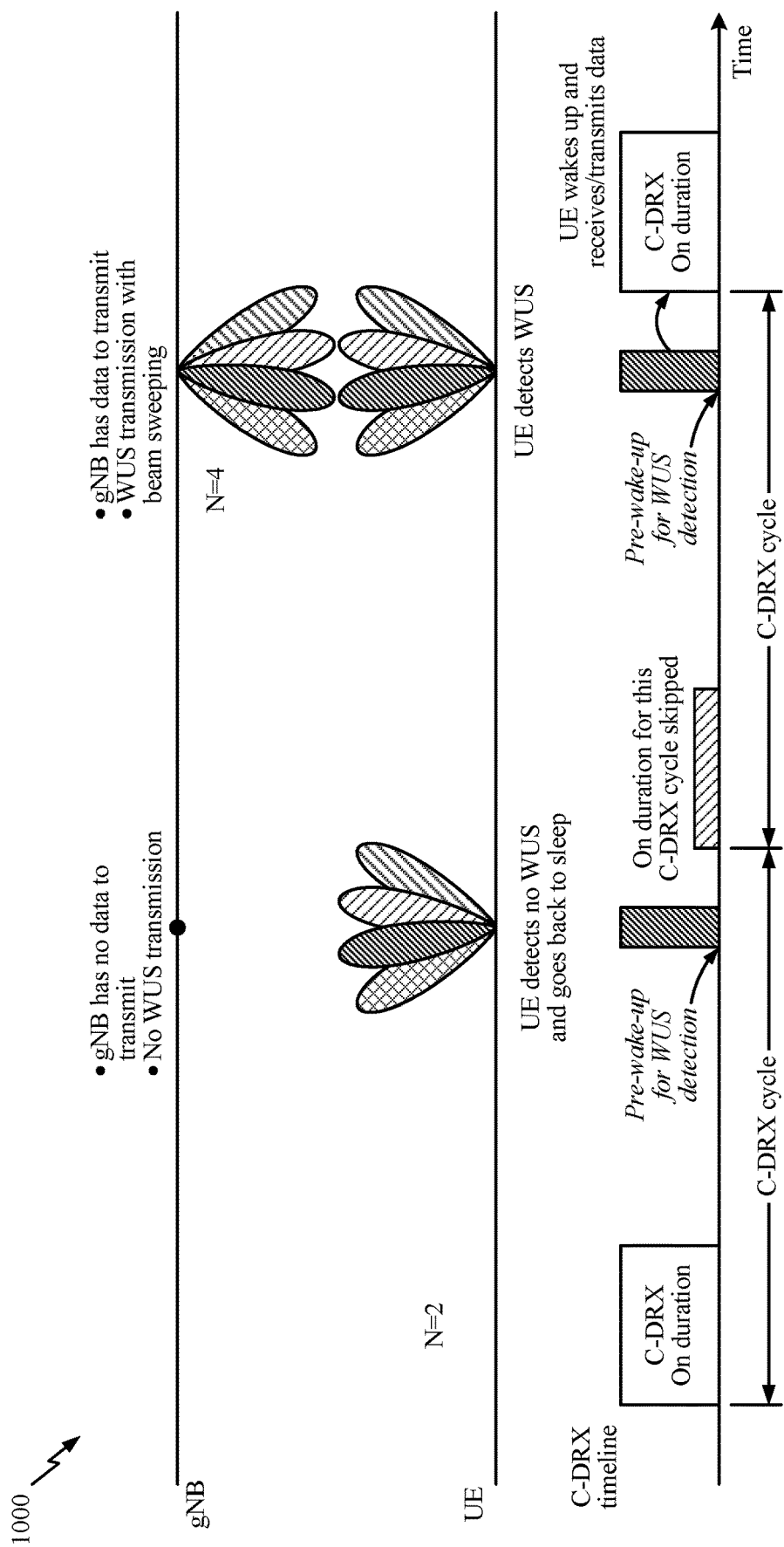
FIG. 10 illustrates example C-DRX with beamformed WUS, in which aspects of the present disclosure may be practiced.

As illustrated in the example timing diagram 1000 of FIG. 10, beamforming may also be applied to WUS transmissions. For example, a set of N (e.g., out of up to 64 SSBs) beams may be configured for a UE. The value of N, and the directions of N beams, may be UE (or group)-specifically determined by gNB (e.g., as a function of link quality, UE mobility, UE capability, C-DRX cycle length, etc.).

Example Wake-Up Beam Management for C-DRX

As described above, wake-up signals (WUS) may be used to improve power efficiency during C-DRX operation, allowing a UE to avoid unnecessarily waking up (to monitor for PDCCH transmissions) during an ON duration of a C-DRX cycle when there is no data for the UE.

For mmW systems, which rely on beamformed transmission and reception (Tx/Rx), beam-sweeping of WUS may be performed. As described above, sweeping N wake-up beams (beams used for WUS transmissions) reduces the probability that the UE misses a WUS transmission from a BS due to beam degradation (e.g., due to misalignment, blocking, etc.). In other words, if the UE detects (WUS transmitted using) at least one of the N wake-up beams, the UE can wake up for the next ON duration.

Even with N beams for sweeping, however, there is still a chance that the UE fails to detect a WUS from the BS. For example, if the DRX cycle is very long or the UE mobility is high, the beam degradation may be very rapid, such that all swept N WUS beams may fail.

Aspects of the present disclosure, however, provide techniques for maintaining beams used for WUS transmissions sent before ON periods of connected-mode discontinuous reception (C-DRX). This beam maintenance may help mitigate the effects of rapid beam degradation- and allow for the selection of one or more new beams to be included in the set of N beams used for sweeping.

Figure 11:
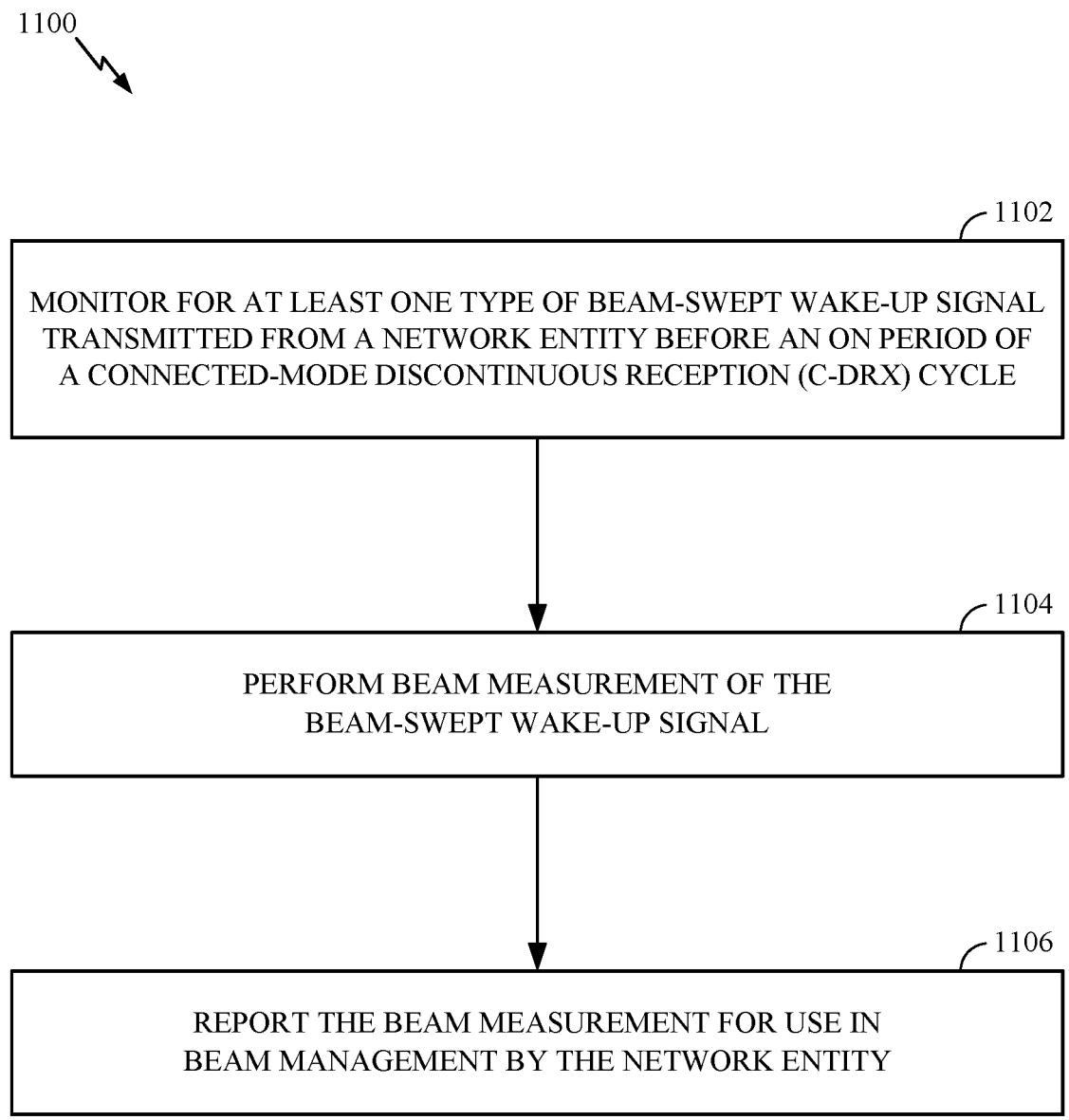
FIG. 11 illustrates example operations for wireless communications by a user equipment, in accordance with certain aspects of the present disclosure.

FIG. 11 illustrates example operations 1100 for wireless communications by a UE, in accordance with aspects of the present disclosure. Operations 1100 may be performed, for example, by a UE in C-DRX state to maintain a set of beams used to send WUS.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 1100 begin, at 1102, by monitoring for at least one type of beam-swept WUS transmitted from a network entity before an ON period of a C-DRX cycle. At 1104, the UE performs beam measurement of the beam-swept WUS. At 1106, the UE reports the beam measurement for use in beam management by the network entity.

Figure 12:
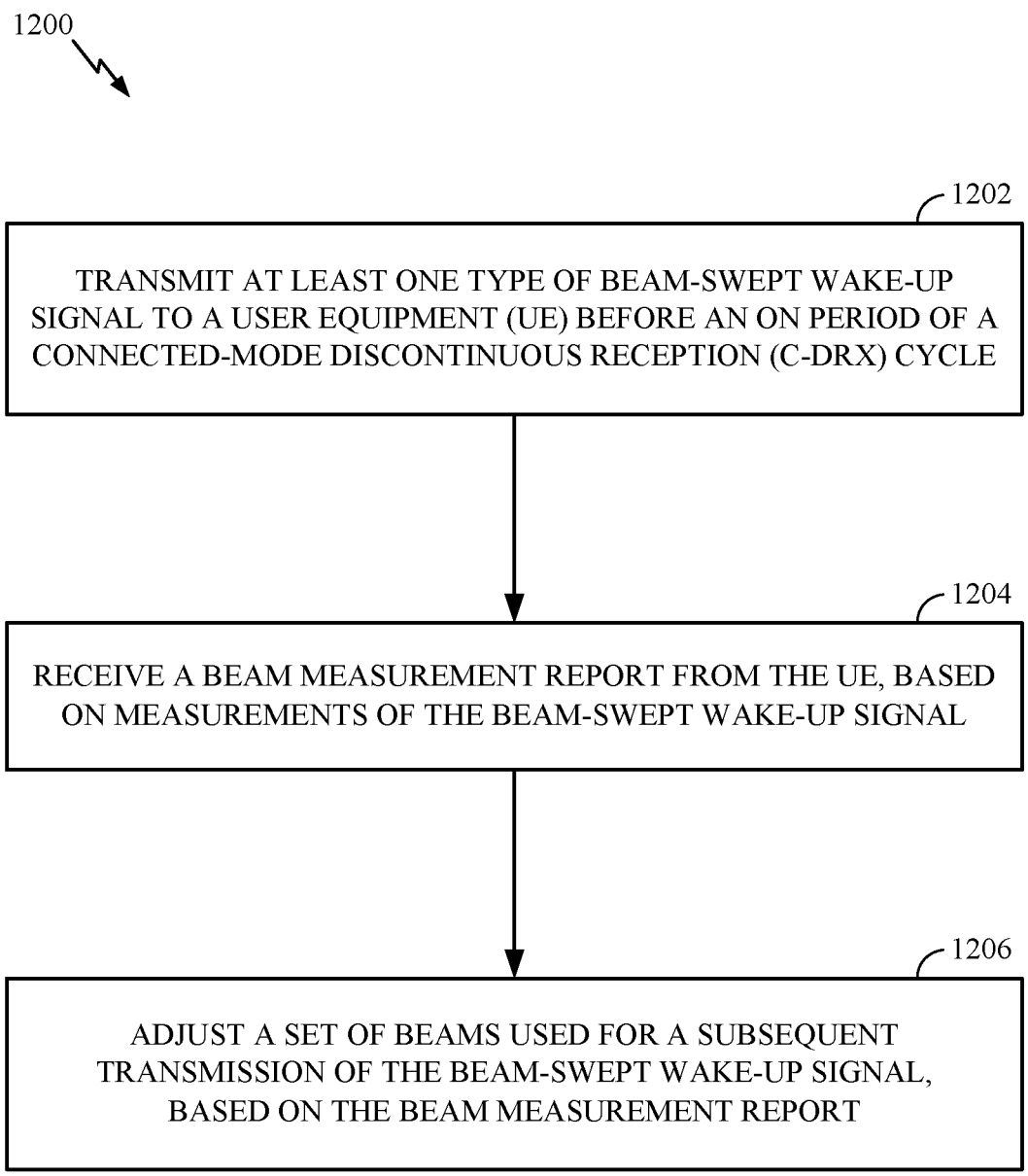
FIG. 12 illustrates example operations for wireless communications by a network entity, in accordance with certain aspects of the present disclosure.

FIG. 12 illustrates example operations 1200 for wireless communications by a network entity (e.g., a base station/gNB). Operations 1200 may be performed, for example, by a base station to maintain a set of beams used to send WUS to a UE in C-DRX state.

According to aspects, the BS may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 1200 begin, at 1202, by transmitting at least one type of beam-swept wake-up signal to a user equipment (UE) before an ON period of a C-DRX cycle. At 1204, the network entity receives a beam measurement report from the UE, based on measurements of the beam-swept WUS. At 1206, the network entity adjusts a set of beams used for a subsequent transmission of the beam-swept WUS, based on the beam measurement report.

As noted above, various types of signals may be used for WUS. In some cases, a PDCCH-type signal may be used for WUS (e.g., PDCCH-type in terms of format and/or DMRS signals transmitted therewith). In some cases, a type of reference signal may be used for WUS. As one example, in NR, a CSI-RS-like or DMRS-like waveform may be used as WUS with beam sweeping. In other workds, while CSI-RS may be used for CSI measurement and beam management for non-DRX mode, but may also be used for WUS.

FIG. 13 has a table 1300 listing various types of WUS and corresponding operations if detected. As illustrated in FIG. 13, different types of WUS may be used for different purposes. For example, a first type of WUS (referred to herein as Type A) may be used for waking up a UE and (possibly) beam management, while a second type of WUS (referred to herein as Type B) may be used for beam management only.

In response to detecting Type A WUS, the UE may prepare to wake up for the next ON duration (and possibly perform beam measurement and reporting). Subsequently, the UE wakes up and starts monitoring PDCCH during the ON duration. The gNB may be triggered to send Type A WUS, for example, when the gNB has data to transmit to the UE in the next ON duration. Type A WUS may have benefits, such as rough (coarse) beam management for the WUS transmissions, which may help fast ramping up of the UE for the next ON duration (e.g., with fast L1 feedback from WUS measurement).

In response to detecting Type B WUS, the UE may perform beam measurement and L1 reporting. Based on the report, the gNB may update the (e.g., N beams of the) WUS beam set and indicate the updated beams to the UE (e.g., via a MAC-CE). After measurement and reporting, the UE may go back to sleep. A gNB may be triggered to send Type B WUS periodically (e.g., once every XDRX cycles), or based on a timer (e.g., Y DRX cycles from the previous Type A/B WUS transmission). Type B WUS may have benefits, such as allowing for occasional beam management to help keep a UE in track (account for beam degradation) when the inactive duration gets very long.

In some cases, the two types of WUS may be distinguished, for example, by different scrambling sequences, resource mapping, or the like. A UE may perform blind decoding to distinguish the two types of WUS. In some cases, if the occasions of two types coincide, only Type A may be transmitted. In other words, Type A may be given priority since it is meant to actually wake the UE up for the next C-DRX ON cycle, while Type B is intended for beam management purposes only.

Figure 14:
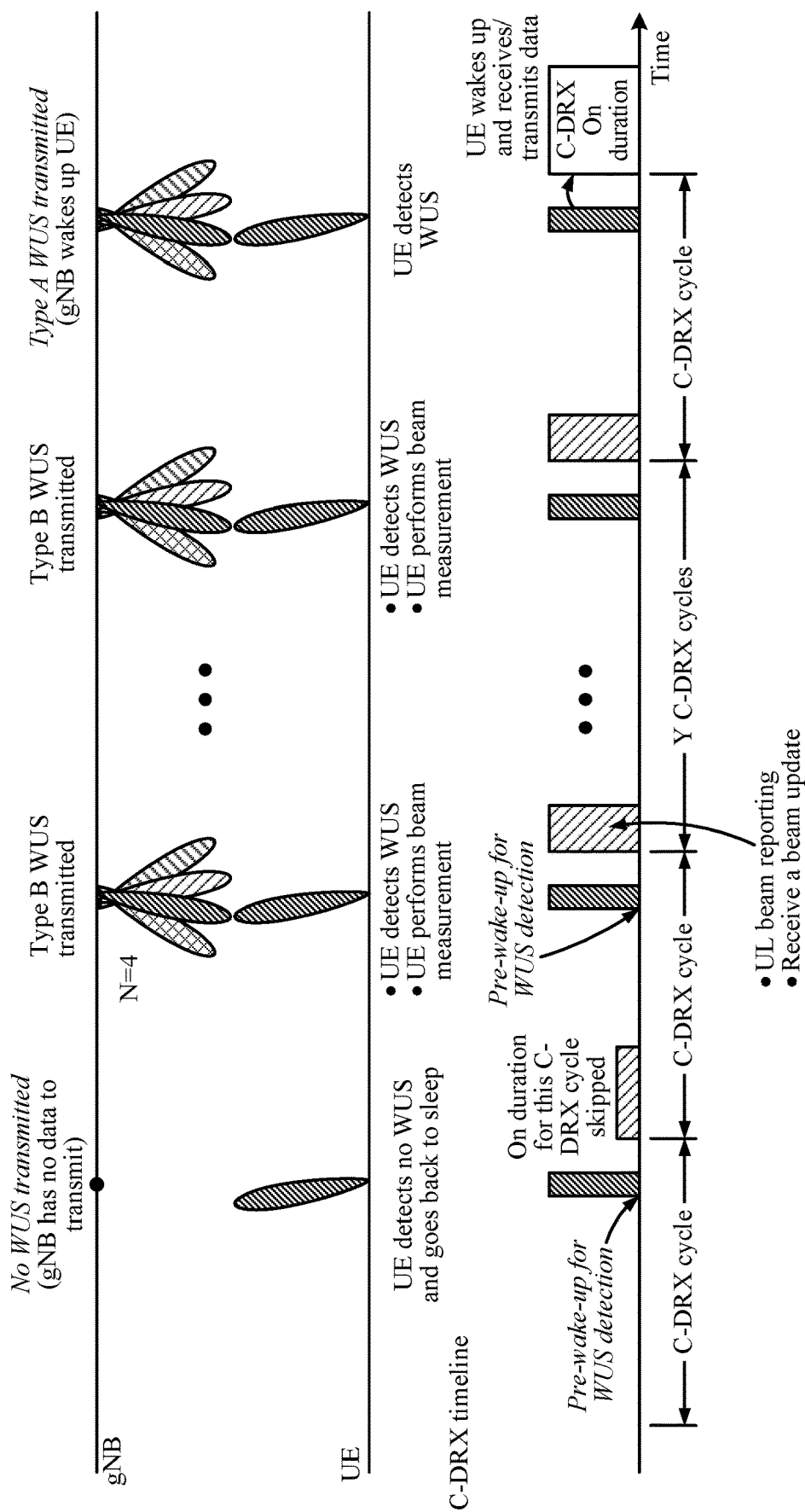
FIG. 14 illustrates an example use of WUS for BM, in accordance with certain aspects of the present disclosure.

FIG. 14 illustrates an example timeline 1400 that demonstrates the use of Type A and Type B WUS described herein. As shown, the primary purpose of Type A WUS is to wake a UE up from the C-DRX mode (e.g., termination of C-DRX operation). On the other hand, the primary purpose of Type B WUS is to provide an opportunity of wake-up signal beam management to the UE.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. For example, various processors of the UE 120 and BS 110 shown in FIG. 4 may be configured to perform the operations described herein and illustrated in FIG. 11 and FIG. 12.

A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 11 and FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE), comprising:
monitoring for a plurality of beam-swept wake-up signal types, comprising a first type of beam-swept wake-up signal designed to cause the UE to wake-up for a subsequent ON period of a discontinuous reception (DRX) cycle and a second type of beam-swept wake-up signal designed for beam management only, transmitted from a network entity before an ON period of the DRX cycle;
performing beam measurement of a detected beam-swept wake-up signal based on a type of the detected beam-swept wake-up signal; and
reporting the beam measurement for use in beam management by the network entity.

2. The method of claim 1, wherein the beam-swept wake-up signal comprises a type of reference signal.

3. The method of claim 1, wherein the UE is configured to:
perform beam measurement based on the first type of beam-swept wake-up signal; and
wake-up to monitor for a physical downlink control channel (PDCCH) transmission in a subsequent ON period of the DRX cycle in response to detecting the first type of beam-swept wake-up signal.

4. The method of claim 3, wherein the UE is configured to:
perform beam measurement based on the second type of beam-swept wake-up signal; and
keep from waking up to monitor for a physical downlink control channel (PDCCH) transmission in the subsequent ON period of the DRX cycle.

5. The method of claim 1, further comprising:
distinguishing between the first and second types of beam-swept wake-up signals.

6. The method of claim 5, wherein the first and second types of beam-swept wake-up signals are distinguished by at least one of: different scrambling sequences or different resource mappings.

7. The method of claim 1, further comprising:
detecting both the first and second type of beam-swept wake-up signal; and
giving priority to the first type of beam-swept wake-up signal.

8. The method of claim 1, wherein the second type of beam-swept wake-up signal is transmitted at least one of periodically or based on a timer relative to transmission of a previous beam-swept wake-up signal.

9. The method of claim 1, further comprising receiving an indication of an updated beam set, based on the measurement report, to be used for subsequent transmissions of the beam-swept wake-up signal.

10. A method of wireless communications by a network entity, comprising:
transmitting at least one of a plurality of beam-swept wake-up signal types, comprising a first type of beam-swept wake-up signal designed to cause the UE to wake-up for a subsequent ON period of a discontinuous reception (DRX) cycle and a second type of beam-swept wake-up signal designed for beam management only, to a user equipment (UE) before an ON period of the DRX cycle, wherein the at least one transmitted beam-swept wake-up signal type comprises an indication of the beam-swept wake-up signal type of that transmission;
receiving a beam measurement report from the UE, based on measurements of the beam-swept wake-up signal performed based on a type of the measured beam-swept wake-up signal; and
adjusting a set of beams used for a subsequent transmission of the beam-swept wake-up signal, based on the beam measurement report.

11. The method of claim 10, wherein the beam-swept wake-up signal comprises a type of reference signal.

12. The method of claim 10, wherein the first and second types of beam-swept wake-up signals are distinguished by at least one of: different scrambling sequences or different resource mappings.

13. The method of claim 10, wherein the second type of beam-swept wake-up signal is transmitted at least one of periodically or based on a timer relative to transmission of a previous beam-swept wake-up signal.

14. The method of claim 10, further comprising transmitting an indication of the adjusted set of beams.

15. The method of claim 10, wherein:
the first type of beam-swept wake-up signal is transmitted when a first condition is met relating to a cause to wake up the UE;
the second type of beam-swept wake-up signal is transmitted when a second condition is met relating to a cause to perform beam management; and only the first type of beam-swept wake-up signal is transmitted if both the first and second conditions are met.

16. An apparatus for wireless communications by a user equipment (UE), comprising:
   means for monitoring for a plurality of beam-swept wake-up signal types, comprising a first type of beam-swept wake-up signal designed to cause the UE to wake-up for a subsequent ON period of a discontinuous reception (DRX) cycle and a second type of beam-swept wake-up signal designed for beam management only, transmitted from a network entity before an ON period of the DRX cycle;
   means for performing beam measurement of the a detected beam-swept wake-up signal based on a type of the detected beam-swept wake-up signal; and
   means for reporting the beam measurement for use in beam management by the network entity.

17. The apparatus of claim 16, wherein the beam-swept wake-up signal comprises a type of reference signal.

18. The apparatus of claim 16, wherein the UE is configured to:
   perform beam measurement based on the first type of beam-swept wake-up signal; and
   wake-up to monitor for a physical downlink control channel (PDCCH) transmission in a subsequent ON period of the DRX cycle in response to detecting the first type of beam-swept wake-up signal.

19. The apparatus of claim 18, wherein the UE is configured to:
   perform beam measurement based on the second type of beam-swept wake-up signal; and
   keep from waking up to monitor for a physical downlink control channel (PDCCH) transmission in the subsequent ON period of the DRX cycle.

20. The apparatus of claim 16, further comprising:
   means for distinguishing between the first and second types of beam-swept wake-up signals.

21. The apparatus of claim 20, wherein the first and second types of beam-swept wake-up signals are distinguished by at least one of: different scrambling sequences or different resource mappings.

22. The apparatus of claim 16, further comprising:
   means for detecting both the first and second type of beam-swept wake-up signal; and
   means for giving priority to the first type of beam-swept wake-up signal.

23. The apparatus of claim 16, wherein the second type of beam- swept wake-up signal is transmitted at least one of periodically or based on a timer relative to transmission of a previous beam-swept wake-up signal.

24. The apparatus of claim 16 further comprising means for receiving an indication of an updated beam set, based on the measurement report, to be used for subsequent transmissions of the beam-swept wake-up signal.

25. An apparatus for wireless communications by a network entity, comprising:
   means for transmitting at least one of a plurality of beam-swept wake-up signal types, comprising a first type of beam-swept wake-up signal designed to cause the UE to wake-up for a subsequent ON period of a discontinuous reception (DRX) cycle and a second type of beam-swept wake-up signal designed for beam management only, to a user equipment (UE) before an ON period of the DRX cycle, wherein the at least one transmitted beam-swept wake-up signal type comprises an indication of the beam-swept wake-up signal type of that transmission;
   means for receiving a beam measurement report from the UE, based on measurements of the beam-swept wake-up signal performed based on a type of the measured beam-swept wake-up signal; and
   means for adjusting a set of beams used for a subsequent transmission of the beam-swept wake-up signal, based on the beam measurement report.

* * * * *